United States Patent
Hintenlang et al.

(10) Patent No.: US 11,560,949 B2
(45) Date of Patent: Jan. 24, 2023

(54) SEALING ELEMENT

(71) Applicant: CARL FREUDENBERG KG, Weinheim (DE)

(72) Inventors: Guenter Hintenlang, Abtsteinach (DE); Martin Heldmann, Lindenfels (DE); Thomas Klenk, Dossenheim (DE); Jens Hofmann, Mannheim (DE)

(73) Assignee: CARL FREUDENBERG KG, Weinheim (DE)

( * ) Notice: Subject to any disclaimer, the term of this patent is extended or adjusted under 35 U.S.C. 154(b) by 70 days.

(21) Appl. No.: 16/587,343

(22) Filed: Sep. 30, 2019

(65) Prior Publication Data

US 2020/0103028 A1 Apr. 2, 2020

(30) Foreign Application Priority Data

Oct. 1, 2018 (DE) .......................... 102018124257.3

(51) Int. Cl.
*F16J 15/06* (2006.01)
*F16C 3/02* (2006.01)
(Continued)

(52) U.S. Cl.
CPC .............. *F16J 15/064* (2013.01); *F16C 3/02* (2013.01); *F16J 15/002* (2013.01); *F16J 15/3268* (2013.01); *F16C 2202/32* (2013.01)

(58) Field of Classification Search
CPC .. F16J 15/00; F16J 15/06; F16J 15/061; F16J 15/0831; F16J 15/062; F16J 15/064; F16J 15/002; F16J 15/162; F16J 15/40; F16J 15/16; F16J 15/50; F16J 15/52; F16J 15/3268; F16J 15/3272; F16J 15/3276; F16C 3/00; F16C 3/02; F16C 2202/00;
(Continued)

(56) References Cited

U.S. PATENT DOCUMENTS

| | | | |
|---|---|---|---|
| 4,844,485 A | * | 7/1989 | Antonini ................ F16J 15/164 277/553 |
| 5,052,696 A | * | 10/1991 | Hatch .................. F16J 15/3232 277/562 |

(Continued)

FOREIGN PATENT DOCUMENTS

| | | |
|---|---|---|
| DE | 29916854 | 1/2000 |
| DE | 10293217 | 4/2004 |

(Continued)

OTHER PUBLICATIONS

Official Action for German Patent Application No. 102018124257.3, dated May 21, 2019, 6 pages.
(Continued)

*Primary Examiner* — Nathan Gumar
(74) *Attorney, Agent, or Firm* — Sheridan Ross P.C.

(57) ABSTRACT

Sealing element for producing an electrically conductive connection between a first machine element and a second machine element, comprising at least one disc-shaped conducting element and a support ring, the support ring comprising an axial flange and a radial flanged, the conducting element being formed from an electrically conductive foil, and the conducting element being secured at least in sections along the axial flange between the support ring and the second machine element.

9 Claims, 4 Drawing Sheets

(51) Int. Cl.
*F16J 15/00* (2006.01)
*F16J 15/3268* (2016.01)

(58) Field of Classification Search
CPC .............. F16C 2202/30; F16C 2202/32; F16C 2202/34
USPC .......................................................... 277/562
See application file for complete search history.

(56) References Cited

U.S. PATENT DOCUMENTS

| | | | |
|---|---|---|---|
| 6,830,641 B2* | 12/2004 | Kosty | F16J 15/3252 277/922 |
| 7,384,494 B2 | 6/2008 | Kosty et al. | |
| 9,388,904 B2* | 7/2016 | Girardot | F16J 15/3268 |
| 10,161,522 B2 | 12/2018 | Colineau et al. | |
| 10,190,690 B2 | 1/2019 | Colineau et al. | |
| 2004/0232620 A1 | 11/2004 | Bock et al. | |
| 2014/0203514 A1* | 7/2014 | Colineau | F16J 15/3232 277/353 |
| 2015/0226332 A1 | 8/2015 | Girardot et al. | |
| 2016/0010750 A1* | 1/2016 | Colineau | F16J 15/3232 277/565 |
| 2018/0313449 A1 | 11/2018 | Dahlhaus-Preussler et al. | |
| 2020/0103029 A1 | 4/2020 | Hintenlang et al. | |

FOREIGN PATENT DOCUMENTS

| | | |
|---|---|---|
| DE | 102013000982 | 7/2014 |
| DE | 102014010269 | 1/2016 |
| DE | 102015224042 | 6/2017 |
| DE | 102016010926 | 9/2017 |
| DE | 102017004061 | 10/2018 |
| EP | 3396216 | 10/2018 |
| JP | S60-175957 | 11/1985 |
| JP | H01-34782 | 10/1989 |
| WO | WO 2018/220031 | 12/2018 |

OTHER PUBLICATIONS

Extended Search Report for European Patent Application No. 19200166.7, dated Mar. 3, 2020, 8 pages.
Extended Search Report for European Patent Application No. 19200168.3, dated Mar. 3, 2020, 8 pages.
Notice of Allowance for U.S. Appl. No. 16/587,417, dated Apr. 30, 2021, 10 pages.

* cited by examiner

SEALING ELEMENT

CROSS-REFERENCE TO RELATED APPLICATIONS

This application claims the benefit of German Patent Application No. 10 2018 124 257.3 filed Oct. 1, 2018, the entire contents of which are incorporated herein by reference in its entirety.

FIELD

The invention relates to a sealing element for producing an electrically conductive connection between a first machine element and a second machine element, comprising at least one disc-shaped conducting element and a support ring.

BACKGROUND

DE 10 2013 000 982 A1 discloses a seal, comprising a sealing ring having at least one dynamically stressed sealing lip and a buffer seal. The buffer seal is arranged adjacent to the sealing lip at an axial spaced disposition and consists of an electrically conductive material. The sealing lip and the buffer seal surround, in a sealing manner, a surface—to be sealed—of a first machine element. The first machine element is arranged adjacent to a second machine element at a radial spaced disposition. The sealing ring and the buffer seal are arranged in the gap formed by the radial spaced disposition. The first machine element and the second machine element are connected together in an electrically conductive manner by the buffer seal. For this purpose, the buffer seal is adjacent to and in contact with the first machine element and also the second machine element. The buffer seal is formed as a potential-equalising ring and consists of an electrically conductive non-woven fabric impregnated with PTFE.

The buffer seal effects potential equalisation between the two machine elements and prevents mechanical damage which can occur when electrical potentials of different magnitude of the machine elements are equalised by an electrical breakdown. An electrical breakdown can cause material to be removed from the machine element with a relatively low charge and a change in the material microstructure in the region in which the electrical breakdown occurs.

A further buffer seal is known from DE 10 2014 010 269 A1. The buffer seal comprises a circular ring-shaped disc consisting of an electrically conductive and air-permeable material and a support body, the disc being formed separately and being connected to the support body. The support body is formed by a sealing ring.

In the previously known seals, the electrically conductive sealing element is secured in an integrally bonded manner along the end face of the radial flange of the sealing ring.

SUMMARY

The object of the invention is to provide a sealing element of the type mentioned above which can be produced in a simple and cost-effective manner.

This object is achieved by the features of claim 1. The dependent claims refer to advantageous embodiments.

In order to achieve the object, the sealing element for producing an electrically conductive connection between a first machine element and a second machine element comprises at least one disc-shaped conducting element and a support ring, the support ring comprising an axial flange and a radial flange, the conducting element being formed from an electrically conductive foil, and the conducting element being secured at least in sections along the axial flange between the support ring and the second machine element. The conducting element can thus be secured on the axial flange by means of a clamping connection or by means of an adhesive connection.

A clamping connection of the sealing disc and the support ring can be produced in a particularly simple manner. In particular, pre-treatment steps for the support ring and/or conducting element can be omitted, these steps being required in most cases for connecting the conducting element to the support ring in an integrally bonded manner.

The conducting element is formed from electrically conductive material and is positioned relative to the support ring such that a clamping connection is produced which fixes the conducting element in position.

In accordance with the invention, the conducting element extends at least in sections along the axial flange of the support ring. In this embodiment, the conducting element is pressed not only in the axial direction but also in the radial direction. Depending upon the design of the support ring, the conducting element can be pressed directly against the inner wall of the second machine element. It is advantageous that direct contact of the conducting element against the second machine element is provided, a comparatively large contact surface for electrical contacting being produced.

A pressing element is preferably provided, which, by means of elastic deformation, effects the clamping connection of the conducting element between the support ring and the second machine element. The pressing element can be formed from an O-ring, the pressing element being placed between the axial flange and conducting element or between the conducting element and the second machine element and effecting the clamping connection. However, the pressing element can also be formed as an elastomer track which is integrally formed directly on the support ring. The pressing element can also comprise a rectangular cross-section which is inserted into the sealing element.

The pressing element can be a separate element which is placed onto the inner ring. Alternatively, the pressing element can also be integrally formed or vulcanised directly onto the inner ring. The pressing element can also be fixed on the inner ring by means of an adhesive connection.

Elastomeric materials are preferably chosen for the material of the pressing element. These have the advantage that the necessary force for the elastic deformation is lower than with metallic materials.

The pressing element can be arranged between the sealing disc and the support ring or between the sealing disc and the second machine element. The conducting element is compressed to a greater extent in the region of the pressing element, which is associated with an improved clamping effect.

The conducting element is formed as a disc from metallic foil. Aluminium or copper foils are particularly feasible in relation to this.

In order to increase the clamping force locally, the support ring can be provided with a pressing contour. The pressing contour can be formed e.g. in the manner of a circumferential bead which protrudes from the axial flange on the outer peripheral side. Alternatively, it is also feasible to provide a circumferential protrusion along the axial flange.

The conducting element can be secured between the support ring and the second machine element. In this embodiment, the second machine element preferably comprises a step with a radial shoulder. The support ring is preferably L-shaped and includes a radial flange and an axial flange. The axial flange is arranged on the radial flange on the outer peripheral side. In this embodiment, a clamping connection is formed between the radial shoulder of the second machine element and the support ring. The conducting element is clamped between the support ring and the second machine element.

Preferably, the conducting element extends along the radial flange and at least in sections along the axial flange of the support ring. In this case, the conducting element connects the first machine element and the second machine element. In this case, it is not necessary for the support ring to be designed in an electrically conductive manner. If the pressing element extends as far as the free end—facing the first machine element—of the conducting element, the conducting element lies with radial bias against the first machine element, the conducting element bulging in sections in the axial direction after mounting. As a result, an electrically conductive connection of the sealing disc and the first machine element is produced.

The electrically conductive connection of the conducting element and the second machine element is produced in this embodiment by virtue of the fact that the conducting element is pressed by the clamping connection directly against the second machine element or against the radial shoulder of the second machine element.

The support ring can comprise an inner ring and an outer ring, the conducting element being secured between the inner ring and the outer ring. In this embodiment, the clamping connection is produced between the inner ring and outer ring. The advantage is that the sealing element together with the conducting element can be formed as a premounted unit. In this embodiment, at least the outer ring is formed in an electrically conductive manner. In this embodiment, the conducting element is clamped between the inner ring and the outer ring.

The inner ring and the outer ring each comprise a radial flange and an axial flange, the outer diameter of the axial flange of the inner ring substantially corresponding to the inner diameter of the axial flange of the outer ring. Proceeding from the support ring, the conducting element extends radially inwards and lies with elastic bias in a sealing manner on the outer peripheral side of the first machine element. The conducting element then bulges in an axial direction which opposes the extension of the axial flange of the support ring.

The free end of the axial flange of the outer ring can be bent radially inwards and at least partially cover the axial flange of the inner ring. As a result, the inner ring can be prevented from being detached from the outer ring.

The inner ring can have a tapering cross-section at the section of the axial flange associated with the radial flange. A receiving space in which the conducting element can extend is produced by the tapering cross-section. In this embodiment, the conducting element can extend along the radial flange of the inner ring and outer ring and in sections also along the axial flange of the inner ring and outer ring.

The support ring can comprise at least one intermediate ring, the conducting element being secured between the inner ring and the intermediate ring and at least one further element being secured between the intermediate ring and the outer ring. Depending upon the design, a plurality of elements can be provided, a conducting element or a further element being arranged in each case between the inner ring, the individual intermediate rings and the outer ring. Elements which consist of mutually different materials can thus be provided.

The elements secured between the inner ring, intermediate ring and outer ring lie with radial bias on the first machine element and bulge in an axial direction. At least the conducting element, like the outer ring, is designed in an electrically conductive manner. The inner ring and/or the intermediate ring can likewise be electrically conductive.

In one advantageous embodiment, the conducting element is electrically conductive and the further element has soft magnetic fittings and acts as an electromagnetic shield to shield against interfering electromagnetic waves. Alternatively, it is also feasible for the inner ring or the intermediate ring to have such soft magnetic fittings. In this respect, the embodiment of the sealing element having two elements permits the production of an electrically conductive connection between the first machine element and the second machine element and—with corresponding fittings—also permits shielding against interfering electromagnetic waves.

It is also feasible in this embodiment for the axial flange of the outer ring to be flattened down inwardly at its free end and thus cover the axial flange of the inner ring, and so the conducting element and the intermediate ring are clamped between the inner ring and the outer ring, the inner ring being locked on the outer ring in a form-fitting manner.

A radial shaft sealing ring can be arranged on the inner ring. This is preferably secured on the radially inner free end of the radial flange of the inner ring. The radial shaft sealing ring comprises a sealing lip which points in the direction of the first machine element. The conducting element extends as far as under the sealing lip and in this respect is arranged between the sealing lip and the first machine element. The sealing lip presses the conducting element radially against the first machine element with elastic bias. The radial bias can be increased when the sealing lip is allocated a spring element, e.g. an annular spiral coiled spring.

Alternatively, an elastomer track can be arranged on the inner ring. A radial shaft sealing ring can be formed from the elastomer track. Furthermore, the elastomer track can cover the end face of the radial flange associated with the outer ring and the surface of the axial flange associated with the second machine element. In the region of the axial flange, the elastomer track forms a static seal. The elastomer track clamps the conducting element between the inner ring and the outer ring. The sealing lip of the radial shaft sealing ring further presses the conducting element against the first machine element.

BRIEF DESCRIPTION OF THE DRAWINGS

Some embodiments of the sealing element in accordance with the invention will be explained in more detail hereinunder with the aid of the figures. The figures show, in each case schematically.

DETAILED DESCRIPTION

Figure 1:
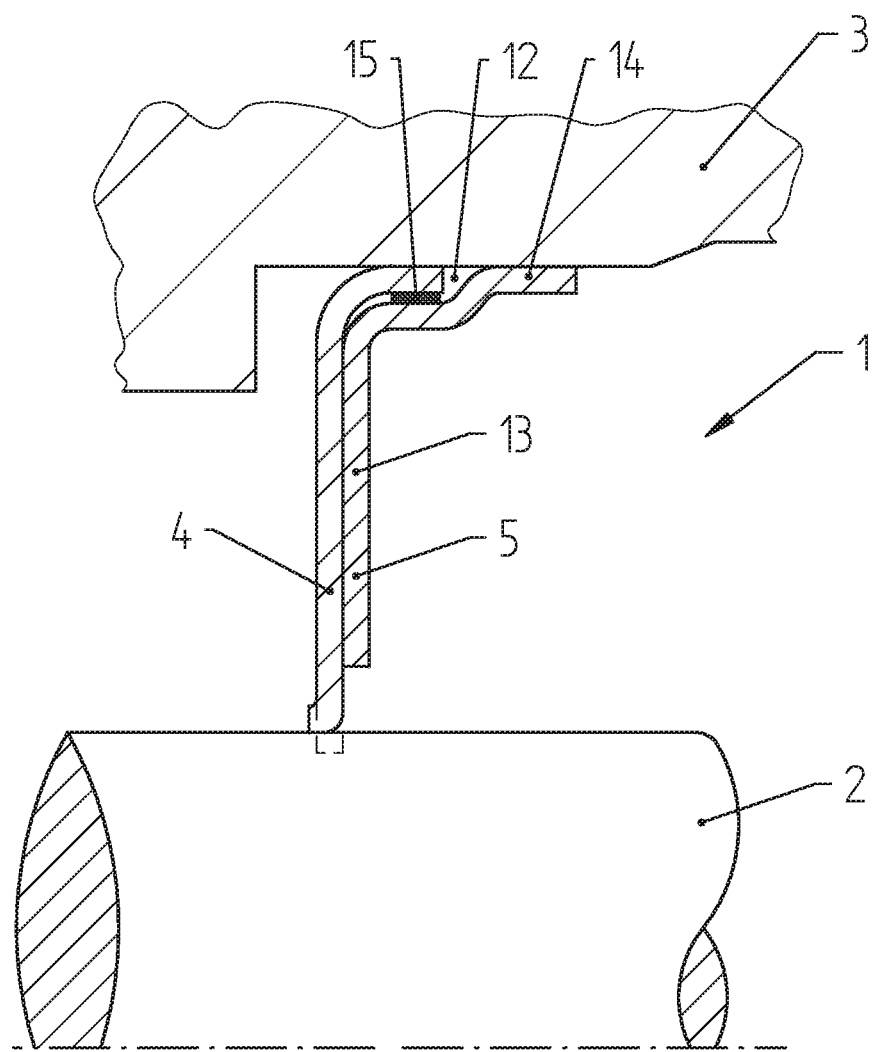
FIG. 1 a sectional view of a sealing element, the conducting element being clamped between the support ring and the housing.

The figures show a sealing element 1 for producing an electrically conductive connection between a first machine element 2 and a second machine element 3. In the present embodiments, the first machine element 2 is a rotating shaft and the second machine element 3 is a housing. The first machine element 2 and the second machine element 3 can be a component of an electric drive of a motor vehicle.

The sealing element 1 includes at least one conducting element 4 and a support ring 5. The conducting element 4 consists of an electrically conductive foil. In the present embodiment, the conducting element 4 is formed of metal and consists of aluminium. The conducting element 4 is secured to the support ring 5 by means of a clamping connection. For this purpose, a pressing element 15 is arranged between the conducting element 4 and the support ring 5.

In the embodiment according to FIG. 1, the conducting element 4 is secured between the support ring 5 and the second machine element 3. On the end face, the conducting element 4 lies against the radial flange 13 of the support ring 5 and extends in sections also on the outer peripheral side over the axial flange 14 of the support ring 5. A radial shoulder is formed from the second machine element 3, the housing, the conducting element 4 being clamped, after mounting, between the radial shoulder of the second machine element 3 and the support ring 5 and being thereby fixed in position.

The pressing element is formed as an O-ring. The O-ring consists of elastomeric material and, by reason of the elastic deformation, presses the conducting element 4 against the second machine element 3.

The support ring 5 comprises a step which produces a space 12 for receiving the conducting element 4. The step is formed in such a way that the pressing element 15 and the conducting element 4 are clamped between the support ring 5 and the second machine element 3, in this case a housing.

In this embodiment, the conducting element 4 forms a dynamic seal with respect to the first machine element 2 and forms a static seal with respect to the second machine element 3. Furthermore, the conducting element 4 extends from the first machine element 2 as far as the second machine element 3 and so the electrically conductive connection can occur exclusively via the conducting element 4. In this respect, it is not necessary in this embodiment for the support ring 5 to consist of electrically conductive material. In this respect, it is feasible to form the support ring 5 from plastic, preferably plastic which can be injection moulded.

The passage of the conducting element 4, through which the first machine element 2, a shaft, protrudes, is preferably round. Alternatively, however, the passage can also be non-round and e.g. comprise a serrated or undulating contour.

Figure 2:
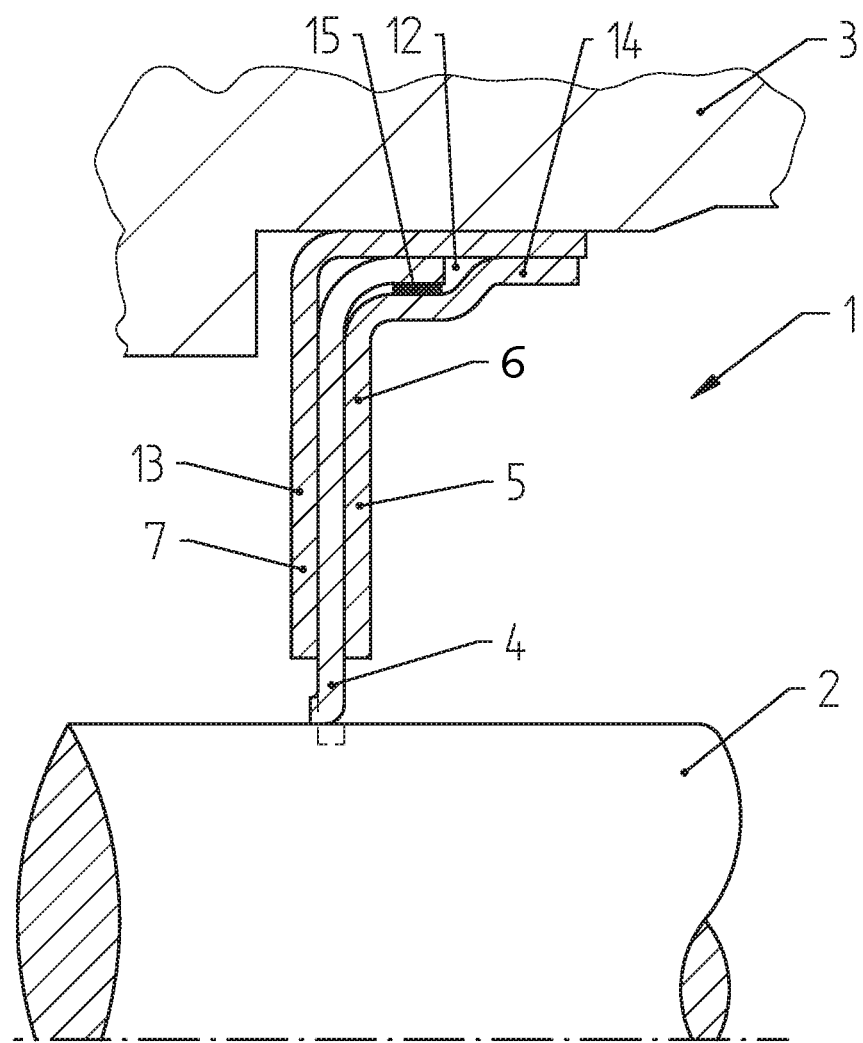
FIG. 2 a sectional view of a sealing element, the support ring of which has an inner ring and an outer ring.

FIG. 2 shows an alternative embodiment of the sealing element 1 shown in FIG. 1. In the embodiment of FIG. 2, the support ring 5 includes an inner ring 6 and an outer ring 7, the conducting element 4 being secured between the inner ring 6 and the outer ring 7. In this embodiment, at least the outer ring 7 is formed of electrically conductive material. Preferably, the inner ring 6 and the outer ring 7 are formed as punched parts and consist of metallic material. The conducting element 4 is clamped between the inner ring 6 and the outer ring 7 and fixed in position at that point, the pressing action being effected by the pressing element 15. The inner ring 6 and the outer ring 7 each comprise a radial flange 13 and an axial flange 14, the outer diameter of the axial flange 14 of the inner ring 6 substantially corresponding to the inner diameter of the axial flange 14 of the outer ring 7. The inner diameter and the outer diameter are selected such that a press-fit arrangement is produced, and so the inner ring 6, the pressing element 15, the conducting element 4 and the outer ring 7 are fitted one inside the other in a captive manner. In this embodiment, the radial flange 13 of the outer ring 7 lies against the radial shoulder of the second machine element 3. In this embodiment, a tapering cross-section is also formed in the region of the axial flange 14 of the inner ring 6 and adjoins the radial flange 13 of the inner ring 6. As a result, a space 12 for receiving the conducting element 4 is formed between the inner ring 6 and outer ring 7.

Figure 3:
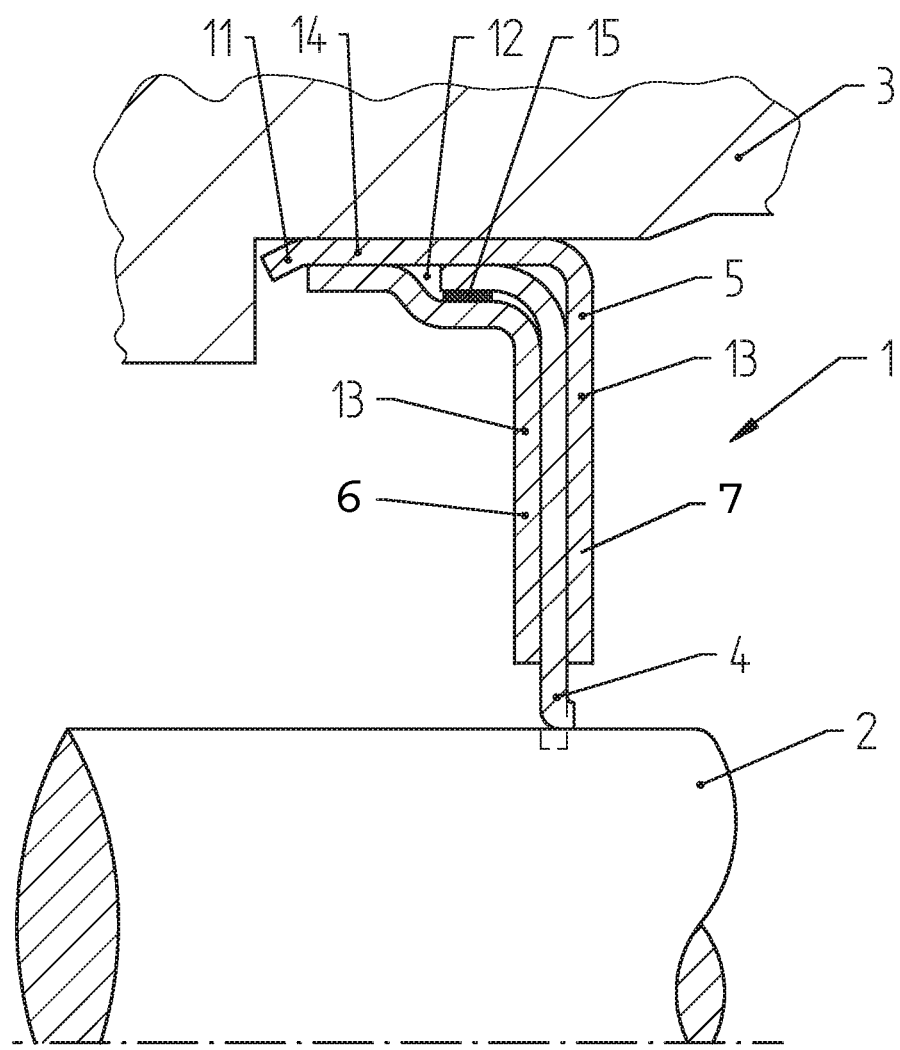
FIG. 3 a sealing element of FIG. 2 with a form-fitting connection of the inner ring and the outer ring.

The embodiment of FIG. 3 shows a development of the sealing element 1 shown in FIG. 2. In this embodiment, the free end 11 of the axial flange 14 of the outer ring 7 is bent radially inwards. For this purpose, the free end 11 is flattened down inwards after mounting the conducting element 4 and the inner ring 6. As a result, the inner ring 6 is locked in the outer ring 7 in a form-fitting manner. Furthermore, owing to the tapering cross-section produced thereby in the region of the free end 11, it is possible to position the sealing element 1 in the second machine element 3 such that the free end 11 lies against the radial shoulder of the second machine element 3. Furthermore, a tapering cross-section is formed in the region of the axial flange 14 of the inner ring 6 and adjoins the radial flange 13 of the inner ring 6. As a result, a space 12 for receiving the conducting element 4 and the pressing element 15 is formed between the inner ring 6 and the outer ring 7.

Figure 4:
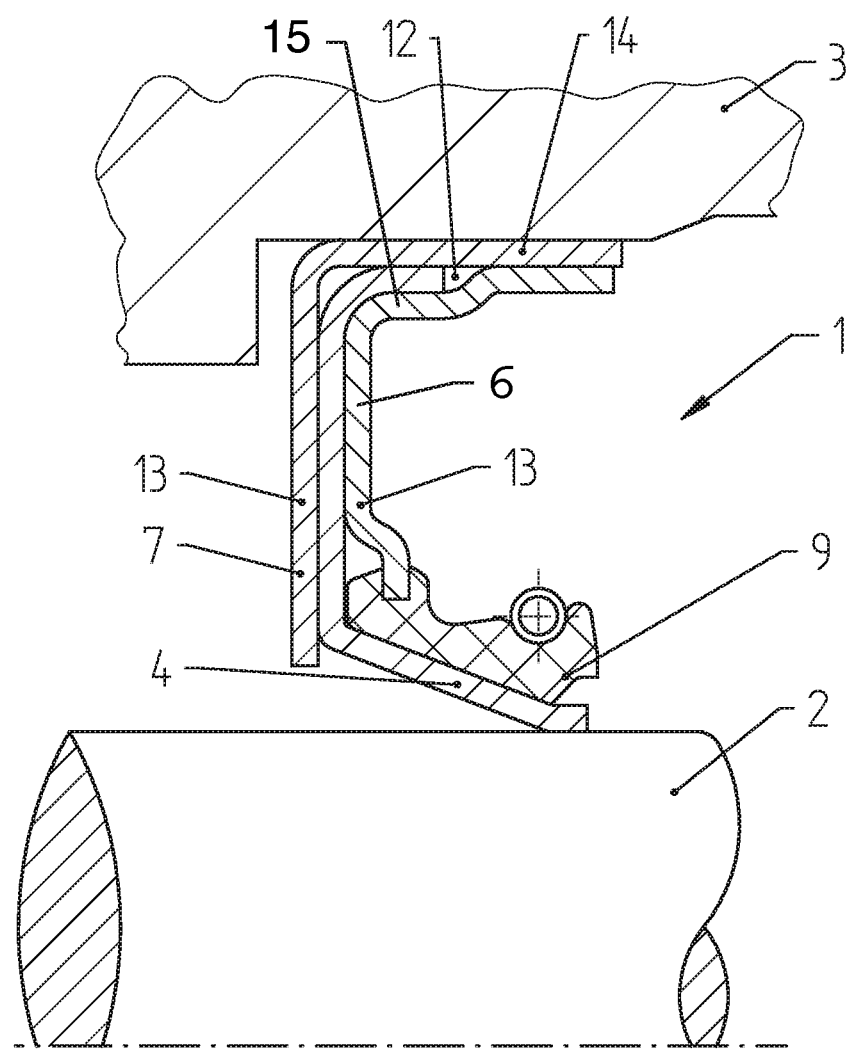
FIG. 4 a sealing element having a radial shaft sealing ring integrally formed on the inner ring.

In this embodiment of FIG. 4, a radial shaft sealing ring 9 is arranged on the end of the radial flange 13 of the outer ring 7, which end is associated with the first machine element 2. The radial shaft sealing ring 9 comprises a support body, which, in the present embodiment, forms the inner ring 6. The radial shaft sealing ring 9 further comprises a sealing lip of elastomeric material, which is integrally formed directly on the inner ring 6. The sealing lip is pressed with radial bias against the first machine element 2 by means of an annular spiral coiled spring. The conducting element 4 extends as far as under the sealing lip so that the conducting element 4 is pressed with radial bias against the first machine element 2 by the sealing lip. Furthermore, an adhesive layer is integrally formed on the inner ring 6 and extends as far as over the axial flange 14 of the inner ring 6 and acts as a pressing element 15 at least in the region of the axial flange 14. By means of the adhesive layer the conducting element 4 is securely fixed between the inner ring 6 and outer ring 7. Furthermore, an electrically conductive connection is provided between the conducting element 4 and the outer ring 7.

What is claimed is:

1. A sealing element for producing an electrically conductive connection between a first machine element and a second machine element, comprising at least one disc-shaped conducting element, a first support ring and an electrically conductive second support ring, the first support ring comprising a first axial flange and a first radial flange, the second support ring comprising a second axial flange and a second radial flange wherein the second axial flange is in contact with the second machine element, the conducting element secured between the first support ring and the second support ring and in contact with and supported by the radial flange of the first support ring and being formed from an electrically conductive foil, the conducting element being secured between the first axial flange and the second axial flange, and a pressing element formed of elastomeric material, the pressing element securing the conducting element between the first support ring and the second machine element by means of elastic deformation.

2. The sealing element according to claim 1, wherein a radial shaft sealing ring is arranged on the first support ring, the radial shaft sealing ring forming the pressing element.

3. The sealing element according to claim 1, wherein an elastomer track is arranged on the first support ring, the elastomer track forming the pressing element.

4. The sealing element of claim 1, wherein the conducting element comprises an axially extending section positioned on the outer peripheral side of the first axial flange of the first support ring.

5. The sealing element of claim 4, wherein the pressing element is disposed between the axially extending section and the first axial flange.

6. The sealing element of claim 1, where in the conducting element comprises at least one of aluminum and copper.

7. A sealing element for producing an electrically conductive connection between a first machine element and a second machine element, comprising a first support ring, the first support ring comprising a first axial flange and a first radial flange, a second electrically conductive support ring comprising a second axial flange and a second radial flange, at least one conducting element formed from an electrically conductive material and comprising a radial body portion and an axial section, the axial section of the conducting element extending an axial distance along the first axial flange of the first support ring less than the axial length of the first axial flange of the first support ring, and a pressing element disposed between the first axial flange of the first support ring and the axial section of the conducting element to frictionally secure the conducting element between the first axial flange of the first support ring and the second axial flange of the second support ring, with the second axial flange of the second support ring in contact with the second machine element and the radial body portion of the conducting element in contact with at least one of the first radial flange of the first support ring and the second radial flange of the second support ring.

8. The sealing element of claim 7, wherein the radial body portion of the conducting element is disc-shaped.

9. The sealing element of claim 7, wherein the first axial flange of the first support ring comprises a step that defines a first axial portion and a second axial portion disposed at different radial distances from the first machine element.

* * * * *